UNITED STATES PATENT OFFICE.

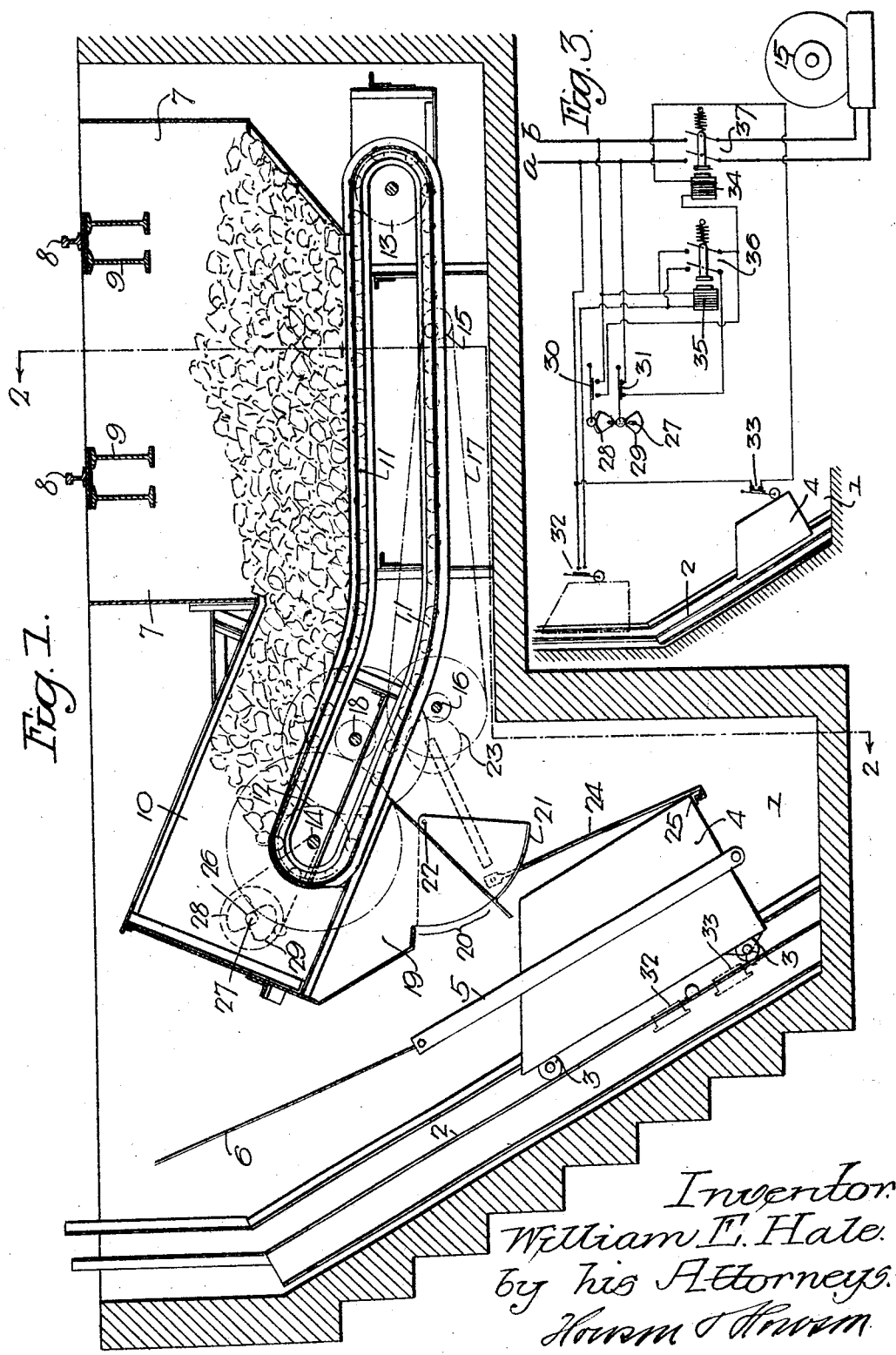

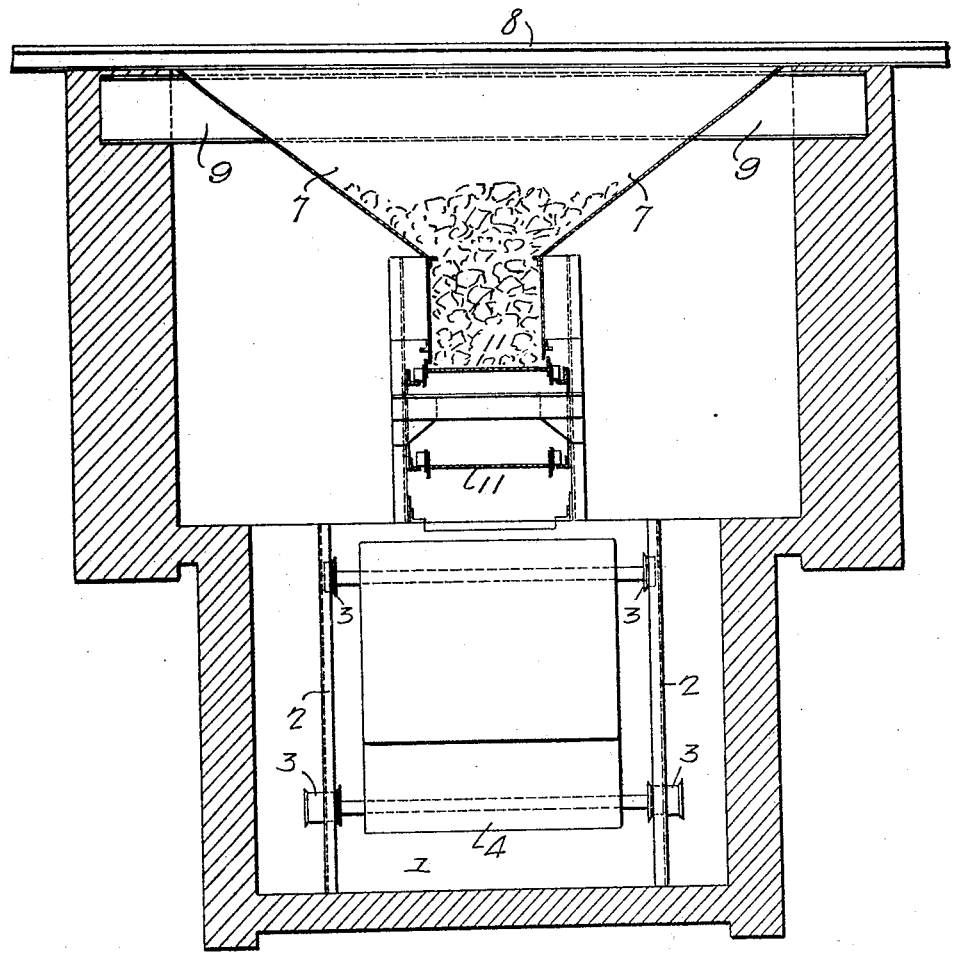

WILLIAM E. HALE, OF FORT WASHINGTON, PENNSYLVANIA, ASSIGNOR TO R. H. BEAUMONT COMPANY, OF PHILADELPHIA, PENNSYLVANIA, A CORPORATION OF PENNSYLVANIA.

APRON-FEED LOADER FOR SKIP HOISTS.

1,413,401.                Specification of Letters Patent.    Patented Apr. 18, 1922.

Application filed May 18, 1921. Serial No. 470,501.

*To all whom it may concern:*

Be it known that I, WILLIAM E. HALE, a citizen of the United States, residing in Fort Washington, Montgomery County, Pennsylvania, have invented certain Improvements in Apron-Feed Loaders for Skip Hoists, of which the following is a specification.

The object of my invention is to improve the means for automatically feeding skip hoist buckets, the flow of material being cut off and the feeding mechanism automatically stopped after the bucket is filled and raised. When the bucket is lowered into position to be filled again the feeding mechanism is automatically started and the filling operation is repeated.

This object I attain in the following manner, reference being had to the accompanying drawings, in which: Fig. 1 is a longitudinal sectional view through the lower portion of a skip hoist structure, showing the feeding mechanism and a bucket in position to receive a load; Fig. 2 is a sectional view on the line 2—2, Fig. 1; and Fig. 3 is a diagrammatic view illustrating the wiring.

Referring to the drawings, 1 is the pit at the lower end of the skip hoist. 2 are the rails on which travel the wheels 3 of the bucket 4 having a bail 5, which is adapted to the hoisting ropes 6. 7 is a hopper. Above the hopper are the rails 8 of a track. These rails are supported by beams 9. The lower end of the hopper is extended at 10 to a point over the bucket.

11 is an endless conveyer in the present instance consisting of side chains and plates of any suitable type. This conveyer passes around sprocket wheels 12 at the forward end and around sprocket wheels 13 at the rear end. The sprocket wheels 12 are mounted on a driving shaft 14. 15 is a driving motor, in the present instance. This motor drives a shaft 16 through a chain 17 and sprocket wheels. The shaft 16 is geared to an intermediate shaft 18 which, in turn, is geared to the shaft 14. Means, described hereinafter, is provided for controlling the motor so that the movement of the conveyer 11 is intermittent.

Directly under the forward end of the conveyer is a chute 19, which receives the material as it is discharged from the end of the conveyer. This chute is carried by the extension 10 of the hopper 7 and has an opening 20 through which the material flows into the bucket 4, when the bucket is in the position illustrated in Fig. 1.

21 is a gate pivoted at 22. This gate is arranged to close the opening 20, when raised. On the gate is a counter weight 23. 24 is a hooked bar pivoted to the gate, and the hook is arranged to engage a lip 25 on the bucket so that when the bucket is lowered to the position illustrated in the drawings, the gate is automatically opened and the material in the chute will flow into the bucket. In some instances the gate may be dispensed with, but I prefer to use a gate to catch the spill.

26 is an electric switch driven from the shaft 14 in the present instance. The switch consists of a driven shaft 27 on which are mounted two cams 28 and 29. The cam 28 operates a switch 30 and the cam 29 operates a switch 31. These switches may be of any of the usual types. 32 is an electric switch at the upper end of the skip hoist structure and 33 is an electric switch at the lower end of the skip hoist structure. These switches are operated by the bucket 4.

The apron feeder motor 15 is electrically driven and is set in motion by the switch 37, which is controlled by the switch 36. The wiring is clearly indicated in the diagrammatic view, Fig. 3 of the drawings. The bucket 4 is operated by independent means, which allows a time interval sufficient for the movement of the switches controlling the apron feeder.

Referring to the diagram, Fig. 3, the operation of the switch mechanism is as follows:

The cam 28, when in the upper position, opens the switch 30 and the cam 29, when in the upper position, opens the switch 31. The skip bucket 4, when passing the switch 32, closes the switch, then opens it, and when the bucket is at the lowest position the switch 33 is closed. The skip bucket coming down closes the switch 32, feeding current from line *a* to magnet 35, the other side of the magnet 35 being connected to line *b*. The magnet is energized and closes switch 36, feeding current from line *b* through closed switch 31 to the magnet 34. The skip bucket continuing down closes switch 33, feeding current from line *a* to magnet 34. The magnut 34 is energized, closing switch 37, which feeds current to the apron feeder motor 15.

This starts the apron feeder and the cam 28 being geared to the feeder is rotated. The cam 28 moves off switch 30 and allows said switch to close, giving another path for current from line $b$ to magnet 34. The cam 29 moves onto the switch 31 and opens said switch, breaking the current from line $a$, which de-energizes the magnet 35 and opens the switch 36. The cam 28 moves onto the switch 30 and opens said switch, de-energizing the magnet 34 and opens switch 37, stopping the apron feeder motor.

As hereinbefore stated, the skip bucket is operated by other means, which allows a time interval sufficient for the above action to take place before it again starts. If the skip bucket should start before the above cycle is completed, then the opening of switch 33 will de-energize magnet 34, opening switch 37 and stopping the apron feeder motor.

It will be seen from the above construction that coal, or other granular material, can be discharged into the hopper 7 from a car, for instance, and will be intermittently fed by the endless conveyer and will be discharged through the chute 19. When the gate 21 is open, the material will flow directly into the skip bucket. When the bucket is loaded, the endless conveyer will be automatically stopped by the electric mechanism hereinbefore described, stopping the flow of material, and, as the bucket is raised, the gate will close the opening in the chute 19. This gate will remain closed until the bucket has ascended to a discharge point and returned empty to receive another load, when the switches will be actuated and the conveyer will again be set in motion, the bucket in the meantime opening the gate so that material fed from the hopper by the conveyer will be discharged into the bucket.

I claim:

1. The combination in a skip hoist, of a bucket; means for raising and lowering the bucket; a hopper; an endless belt conveyer located under the hopper and arranged to discharge material from the hopper; and means for automatically controlling the movement of the conveyer from the bucket.

2. The combination in apparatus for loading buckets of skip hoists, of a hopper; an endless belt conveyer located under the hopper; a chute at the outer end of the conveyer; a gate arranged to close the chute; a bucket controlling the movement of the gate; and means for intermittently operating the conveyer so as to load the bucket with a given amount of material.

3. The combination of a bucket; means for raising and lowering the bucket; a hopper having an extension; an endless belt conveyer extending under the bottom of the hopper and into the extension; a chute under the extension into which the conveyer discharges material; a gate for closing the chute, said gate having a portion extending over the bucket; a bar attached to the gate and actuated by the bucket so that the gate is under the control of the bucket; means for driving the conveyer; and switch mechanism controlled by the bucket for applying power to the conveyer when the bucket is in position to receive a load and to cut off the power when the bucket is loaded.

4. The combination in means for loading buckets of skip hoists, of a bucket; means for raising and lowering the bucket; a hopper; an endless belt conveyer at the bottom of the hopper and extending under the forward end thereof; a chute directly under the forward end of the conveyer; electric mechanism for driving the conveyer; cams driven by said mechanism; switches actuated by the cams; switches actuated by the bucket; and electric mechanism whereby the motor for driving the conveyer is governed through the said switches by the bucket.

WILLIAM E. HALE.